(12) United States Patent
Balakrishnan et al.

(10) Patent No.: US 12,259,991 B2
(45) Date of Patent: *Mar. 25, 2025

(54) NESTED ROW ACCESS POLICIES

(71) Applicant: Snowflake Inc., Bozeman, MT (US)

(72) Inventors: Raja Suresh Krishna Balakrishnan, Fremont, CA (US); Jashua Gupta, San Carlos, CA (US); Jian Xu, San Jose, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,531

(22) Filed: Dec. 22, 2023

(65) Prior Publication Data
US 2024/0419828 A1    Dec. 19, 2024

Related U.S. Application Data

(63) Continuation of application No. 18/227,781, filed on Jul. 28, 2023, now Pat. No. 11,868,496.

(60) Provisional application No. 63/507,961, filed on Jun. 13, 2023.

(51) Int. Cl.
*G06F 21/62* (2013.01)

(52) U.S. Cl.
CPC .................. *G06F 21/6218* (2013.01)

(58) Field of Classification Search
None
See application file for complete search history.

(56) References Cited

U.S. PATENT DOCUMENTS

| | | | | |
|---|---|---|---|---|
| 11,567,943 B1 * | 1/2023 | Blum | ................ | G06F 21/6227 |
| 2022/0138342 A1 * | 5/2022 | Avanes | ............... | G06F 21/6218 |
| | | | | 726/26 |

OTHER PUBLICATIONS

"PCT International Search Report" for the International Application No. PCT/US2024/031243, mailed on: Jun. 25, 2024, pp. 1-6.

* cited by examiner

*Primary Examiner* — Brandon Hoffman
(74) *Attorney, Agent, or Firm* — Womble Bond Dickinson (US) LLP

(57) ABSTRACT

Methods of referencing row access policy (RAP) protected mapping tables in a RAP for a data table are disclosed herein. An example method of referencing a mapping table in a data table using nested RAP includes defining, by a processing device, a first access policy for the mapping table to control access by specific users or under specific conditions. The processing device further defines a second access policy attached to the data table referencing the mapping table. The processing device in response to a query, executes the second access policy of the data table to provide a response or operation of data associated with the data table and the mapping table. Executing the second access policy invokes executing the first access policy of the mapping table. The executing of both the second access policy of the data table and the first access policy of the mapping table are recorded.

20 Claims, 7 Drawing Sheets

600

DEFINE, BY A PROCESSING DEVICE, A FIRST ACCESS POLICY FOR THE MAPPING TABLE TO CONTROL ACCESS BY SPECIFIC USERS OR UNDER SPECIFIC CONDITIONS
610

DEFINE, BY THE PROCESSING DEVICE, A SECOND ACCESS POLICY ATTACHED TO THE DATA TABLE REFERENCING THE MAPPING TABLE
620

IN RESPONSE TO A QUERY, EXECUTE, BY THE PROCESSING DEVICE, THE SECOND ACCESS POLICY OF THE DATA TABLE TO PROVIDE A RESPONSE OR OPERATION OF DATA ASSOCIATED WITH THE DATA TABLE AND THE MAPPING TABLE, WHEREIN EXECUTING THE SECOND ACCESS POLICY INVOKES EXECUTING THE FIRST ACCESS POLICY OF THE MAPPING TABLE
630

FIG. 6

NESTED ROW ACCESS POLICIES

CROSS-REFERENCE TO RELATED APPLICATION

This application is a continuation of the U.S. patent application Ser. No. 18/227,781, filed Jul. 28, 2023, issued as U.S. Pat. No. 11,868,496 issued Jan. 9, 2024, which claims the benefit of and priority to the U.S. provisional patent application No. 63/507,961 filed on Jun. 13, 2023, titled "Nested Row Access Policies," the disclosures of which are incorporated herein by reference in the entirety.

TECHNICAL FIELD

The present disclosure relates to databases and more particularly to granular security level access.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and the transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

Traditional database management requires companies to provision infrastructure and resources to manage the database in a data center. Management of a traditional database can be very costly and requires oversight by multiple persons having a wide range of technical skill sets. Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

A cloud database system may implement row-level security through the use of row access policies (RAPs) to determine which rows to return in the query result. A RAP allows a particular role to view or access a mapping table in the policy definition to determine access to rows in the query result. A RAP is a schema-level object that determines whether a given row in a table or view can be viewed from one or more operational statements (e.g., select, update, etc.). RAPs may include conditions and functions in the policy expression to transform the data at query runtime when those conditions are met. The RAP may support segregation of duties to allow governance teams to define policies that can limit sensitive data exposure. The RAP approach includes an object owner (the role with the OWNERSHIP privilege on the object, such as a table or view) who normally has full access to the underlying data. A single policy can be set on different tables and views at the same time.

Conventional cloud database systems do not allow RAPs to be created to refer to other RAP protected tables. For example, the cloud database systems do not execute (e.g., by returning with an error message) commands to create a RAP that references a RAP-protected mapping table. As such, a user has to duplicate relevant columns across tables to enable the referencing. But such workaround creates additional problems, such as keeping the duplicate columns in other tables in synchronization or up-to-date with the source columns, substantially increasing the overhead. The increase of the overhead also includes having the RAPs of the tables copy the logic from the RAPs with source data.

In light of the foregoing, disclosed herein are systems, methods, and devices for resolving the issues identified above.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where:

FIG. 6 illustrates a schematic flow chart diagram of a method for creating a data table RAP referencing a protected mapping table, in accordance with the teachings and principles of the disclosure.

Like numerals indicate like elements.

DETAILED DESCRIPTION

Figure 1:
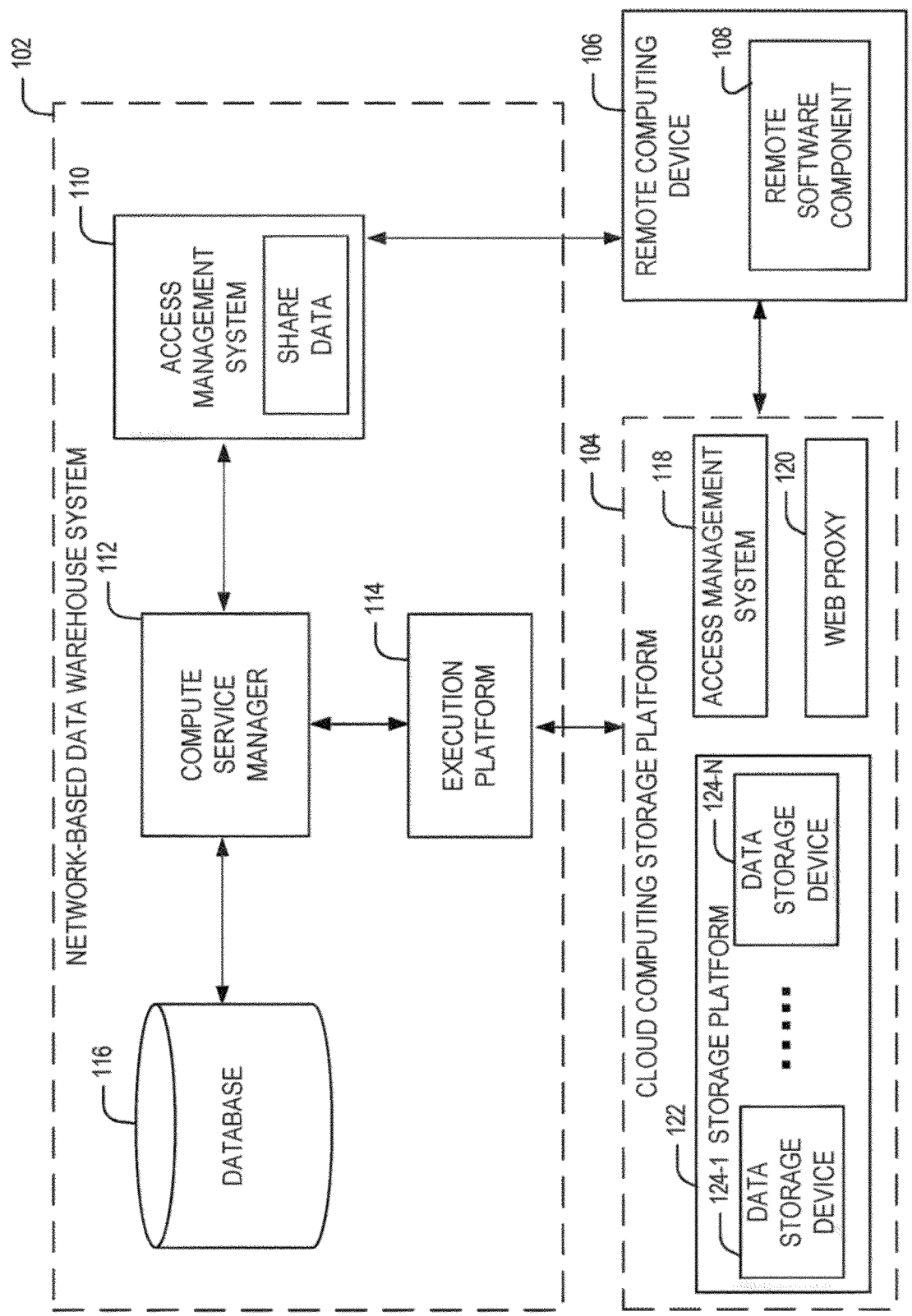
FIG. 1 illustrates an example computing environment in which a network-based data warehouse system implements streams on shared database objects in accordance with the teachings and principles of this disclosure.

Systems, methods, and devices for referencing row access policy (RAP) protected mapping tables in a RAP for a data table are disclosed herein. A RAP generally refers to any low-level security policy (or granular or fine grain level security). Row-level security (RLS) may provide fine-grained access control based on flexible, user-defined access policies to databases, tables, objects, and other data structures. A RAP, as described herein, may be an entity or object that defines rules for row access. A RAP may be defined in a way that it is decoupled or independent from any specific table (e.g., a mapping table). This allows more robust and flexible control. A RAP may be attached to one or more tables.

Often, a mapping table contains information about which users can access what rows (or columns)) in the data table, and hence is useful as a lookup table for other RAPs. Conventional systems or methods do not support users to create or generate a RAP that references another RAP-protected table. As such, the users must duplicate relevant column(s) from the mapping table into the data table (as a workaround in view of the limitation). Such workaround methods introduce operational issues related to keeping the data in sync (and causing additional operation overhead for the duplication). This limitation also prevents some users from rolling out RAP on their tables. The present disclosure resolves these limitations by using nested RAPs that enable referencing a table with a RAP attached to the table, which in turn may reference another table with a respective RAP attached thereto.

In an example aspect, the present disclosure provides a method of referencing a mapping table in a data table. The method includes defining, by a processing device, a first access policy for the mapping table to control access by specific users or under specific conditions. The processing device further defines a second access policy attached to the data table referencing the mapping table. The processing device in response to a query, executes the second access policy of the data table to provide a response or operation of data associated with the data table and the mapping table. Executing the second access policy invokes executing the first access policy of the mapping table.

For example, a user may define a nested RAP that references a RAP-protected mapping table. A nested RAP protects a data table that is associated with the RAP-protected mapping table, so that when the dependent RAP (of the data table) is executed, the mapping table RAP is also executed (e.g., implementing row level securities defined in the RAPs). Previously, without the nested RAP, the user may not create or generate the RAP for the data table (and the related executions would be denied or terminated without processing). The nested RAP mechanisms disclosed herein enables an unlimited number of nesting (e.g., the RAP dependency may be two or more, also referred to as a RAP chain). For example, the user may create multiple cross referencing tables each with a respective RAP attached thereto. In some cases, the user may define an upper limit for the RAP chain (e.g., length of dependencies, such as ten) to ensure system efficiency.

The nested RAP mechanism disclosed herein may include multiple features. For example, as the user creates or executes the nested RAPs, the operation stream or changes are recorded or tracked. The user's authorities or role-status (e.g., active or otherwise) for the operations are checked according to the corresponding role and RAPs. Access histories of the associated tables may also be saved for RAP creation or validation. The RAPs executions may be verified or validated against policy context in view of the user's role and conditions defined in the related RAPs. The nested RAP mechanism may implement memorization or recording functions to identify the referencing relationships of a RAP referencing a RAP-protected mapping table.

In the following description of the disclosure, reference is made to the accompanying drawings, which form a part hereof, and in which is shown by way of illustration specific implementations in which the disclosure may be practiced. It is understood that other implementations may be utilized, and structural changes may be made without departing from the scope of the disclosure.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

Reference throughout this specification to "one embodiment," "an embodiment," "one implementation," "an implementation," "one example," or "an example" means that a particular feature, structure, or characteristic described in connection with the embodiment, implementation, or example is included in at least one embodiment of the present disclosure. Thus, appearances of the above-identified phrases in various places throughout this specification are not necessarily all referring to the same embodiment, implementation, or example. In addition, it should be appreciated that the figures provided herewith are for explanation purposes to persons ordinarily skilled in the art.

As used herein, the terms "comprising," "including," "containing," and grammatical equivalents thereof are inclusive or open-ended terms that do not exclude additional, unrecited elements or method steps.

As used herein, "table" is defined as a collection of records (rows). Each record contains a collection of values of table attributes (columns). Tables are typically physically stored in multiple smaller (varying size or fixed size) storage units, e.g. files or blocks.

As used herein, "partitioning" is defined as physically separating records with different data to separate data partitions. For example, a table can partition data based on the country attribute, resulting in a per-country partition.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein may operate on a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database, and any type of data storage and retrieval platform, using any data storage architecture and using any language to store and retrieve data within the data storage and retrieval platform. The systems and methods described herein further provide a multi-tenant system that supports isolation of computing resources and data between different customers/clients and between different users within the same customer/client.

FIG. 1 illustrates an example shared data processing platform implementing secure messaging between deployments. As shown, the shared data processing platform includes the network based data warehouse system 102, a cloud computing storage platform 104 (e.g., a storage platform, an AWS® service, Microsoft Azure®, or Google Cloud Platform®), and a remote computing device 106. The network based data warehouse system 102 is a network based system used for storing and accessing data (e.g., internally storing data, accessing external remotely located data) in an integrated manner, and reporting and analysis of the integrated data from the one or more disparate sources (e.g., the cloud computing storage platform 104).

The cloud computing storage platform 104 includes multiple computing machines and provides on-demand computer system resources, such as data storage and computing power, to the network based data warehouse system 102. While in the example illustrated in FIG. 1, a data warehouse is depicted, other embodiments may include other types of databases or other data processing systems. The cloud computing storage platform 104 provides a variety of storage and data management functionalities, such as data storage, scalability, data redundancy and replication, data security, backup and disaster recovery, data lifecycle management, integration, among others. Row level security and RAPs enable various users with different roles to properly access and use the functionalities within respective authorizations or privileges. As such, the nested RAPs disclosed herein may enhance various functionalities of the cloud computing storage platform 104, as discussed below.

The remote computing device 106 (e.g., a user device such as a laptop computer) includes one or more computing machines (e.g., a user device such as a laptop computer) that execute a remote software component 108 (e.g., browser accessed cloud service) to provide additional functionality to users of the network based data warehouse system 102. The remote software component 108 includes a set of machine-readable instructions that, when executed by the remote computing device 106, cause the remote computing device 106 to provide certain functionalities of the cloud computing storage platform 104 as mentioned above. The remote software component 108 may operate on input data and generates result data based on processing, analyzing, or otherwise transforming the input data. As an example, the remote software component 108 can be a data provider or data consumer that enables database tracking procedures, such as streams on shared tables and views.

The network based data warehouse system 102 includes an access management system 110, a computer service manager 112, an execution platform 114, and a database 116. The access management system 110 enables administrative users to manage access to resources and services provided by the network based data warehouse system 102. Administrative users can create and manage users, roles, and groups, and use permissions to allow or deny access to resources, functionalities, and services at the network based data warehouse system 102. The access management system 110 can store share data that securely manages shared access to the storage resources of the cloud computing storage platform 104 amongst different users of the network based data warehouse system 102, as discussed in further detail below.

The compute service manager 112 coordinates and manages operations of the network based data warehouse system 102. The compute service manager 112 performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to the database 116, which is associated with the entirety of data stored on the shared data processing platform 100. The database 116 stores data pertaining to various functions and aspects associated with the network based data warehouse system 102 and its users. In some embodiments, the database 116 includes a summary of data stored in remote data storage systems as well as data available from one or more local caches. Additionally, the database 116 may include information regarding how data is organized in the remote data storage systems and the local caches. The database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

The execution platform 114 is coupled to multiple data storage devices 124-1 to 124-N that belong to a cloud computing storage platform 104. In some embodiments, the data storage devices 124-1 to 124-N are cloud-based storage devices located in one or more geographic locations. For example, the data storage devices 124-1 to 124-N may be part of a public cloud infrastructure or a private cloud infrastructure. The data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems), object storage systems, and the like.

The execution platform 114 includes a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (QOM) error mitigation process; a third process that extracts health information from process logs and status information to send back to the compute service manager 112; a fourth process to establish communication with the compute service manager 112 after a system boot; and a fifth process to handle the communication with a compute cluster for a given job provided by the compute service manager 112 and to communicate information back to the compute service manager 112 and other compute nodes of the execution platform 114.

The cloud computing storage platform 104 also includes an access management system 118 and a web proxy 120. As with the access management system 110, the access management system 118 allows users to create and manage users, roles, and groups, and use permissions to allow or deny access to cloud services and resources. The access management system 110 of the network based data warehouse system 102 and the access management system 118 of the cloud computing storage platform 104 can communicate and share information so as to enable access and management of resources and services shared by users of both the network based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network based data warehouse system 102 based on the changing data storage/retrieval needs as well as the changing needs of the users and systems accessing the shared data processing platform 100. The support of dynamic changes allows network based data warehouse system 102 to scale quickly in response to changing demands on the systems and components within network based data warehouse system 102. The decoupling of the computing resources from the data storage devices 124-1 to 124-N supports the storage of large amounts of data without requiring a corresponding large amount of computing resources.

Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Though the compute service manager 112, the database 116, the execution platform 114, the cloud computing storage platform 104, and the remote computing device 106 are shown in FIG. 1 as individual components, they may be implemented as a distributed system (e.g., distributed across multiple systems/platforms at multiple geographic locations) connected by APIs and access information (e.g., tokens, login data). Additionally, each of the compute service manager 112, the database 116, the execution platform 114, and the cloud computing storage platform 104 can be scaled up or down (independently of one another) depending on changes to the requests received and the changing needs of shared data processing platform 100. Thus, in the described embodiments, the network based data warehouse system 102 is dynamic and supports regular changes to meet the current data processing needs.

During operation, the network based data warehouse system 102 may process multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task.

The metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, the computing resources and the cache resources may retrieve data from, and store data to, any of the data storage resources in the cloud computing storage platform 104.

Figure 2:
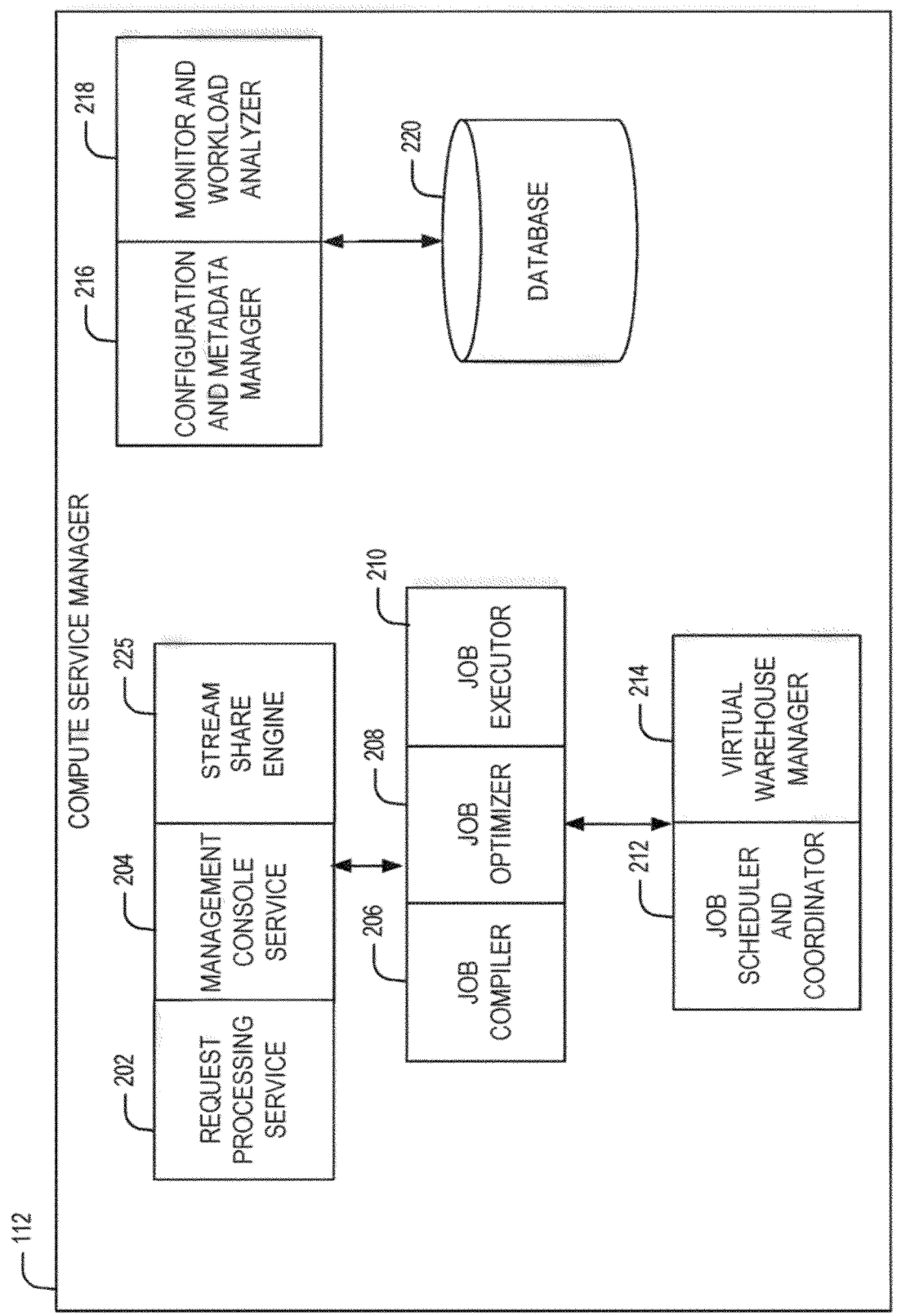
FIG. 2 illustrates a block diagram illustrating components of a compute service manager in accordance with the teachings and principles of the disclosure.

FIG. 2 is a block diagram illustrating components of the compute service manager 112, in accordance with aspects of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104.

A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks.

A virtual warehouse manager 214 manages the operation of multiple virtual warehouses implemented in the execution platform 114. As discussed below, each virtual warehouse includes multiple execution nodes that each include a cache and a processor (e.g., a virtual machine, or an operating system level container execution environment).

The compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job.

A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network based data warehouse system 102 and may further redistribute tasks based on a user (e.g., "external") query workload that may also be processed by the execution platform 114.

Additionally, the configuration and metadata manager 216 may manage the information related to the data stored in the remote data storage devices and in the local caches. The monitor and workload analyzer 218 oversees the processes performed by the compute service manager 112 and manages the distribution of tasks (e.g., workload) across the virtual warehouses and execution nodes in the execution platform.

The configuration and metadata manager 216 and the monitor and workload analyzer 218 are coupled to a data storage device 220 (database). The data storage device 220 in FIG. 2 represents any data storage device within the network-based data warehouse system 102. For example, data storage device 220 may represent caches in execution platform 114, storage devices in cloud computing storage platform 104, or any other storage devices.

In some cases, the compute service manager 112 may include other components or functionalities not expressly shown in FIG. 2. For example, the compute service manager 112 may further include an access manager and/or a key manager coupled to the database 220. The access manager may handle authentication and authorization tasks for the systems described herein. The key manager may manage storage and authentication of keys used during authentication and authorization tasks. The request processing service 202 manages, along with the access manager and/or the key manager, received data storage requests and data retrieval requests. The management console service 204 may collaboratively supports access to various systems and processes by administrators and other system managers.

The compute service manager 112 may also include a compute service manager 112 that includes an SQL compiler, an SQL optimizer, and an SQL executor. The SQL compiler parses SQL queries and generates the execution code for the queries. The SQL optimizer determines the best method to execute queries based on the data that needs to be processed. The SQL executor executes the query code for queries received by resource manager. The job scheduler and coordinator 212 may send received queries to the appropriate services or systems for compilation, optimization, and dispatch to the compute service manager 112. The virtual warehouse manager 214 manages the operation (e.g., in view of the received queries or jobs) of multiple virtual warehouses implemented in an execution platform.

Figure 3:
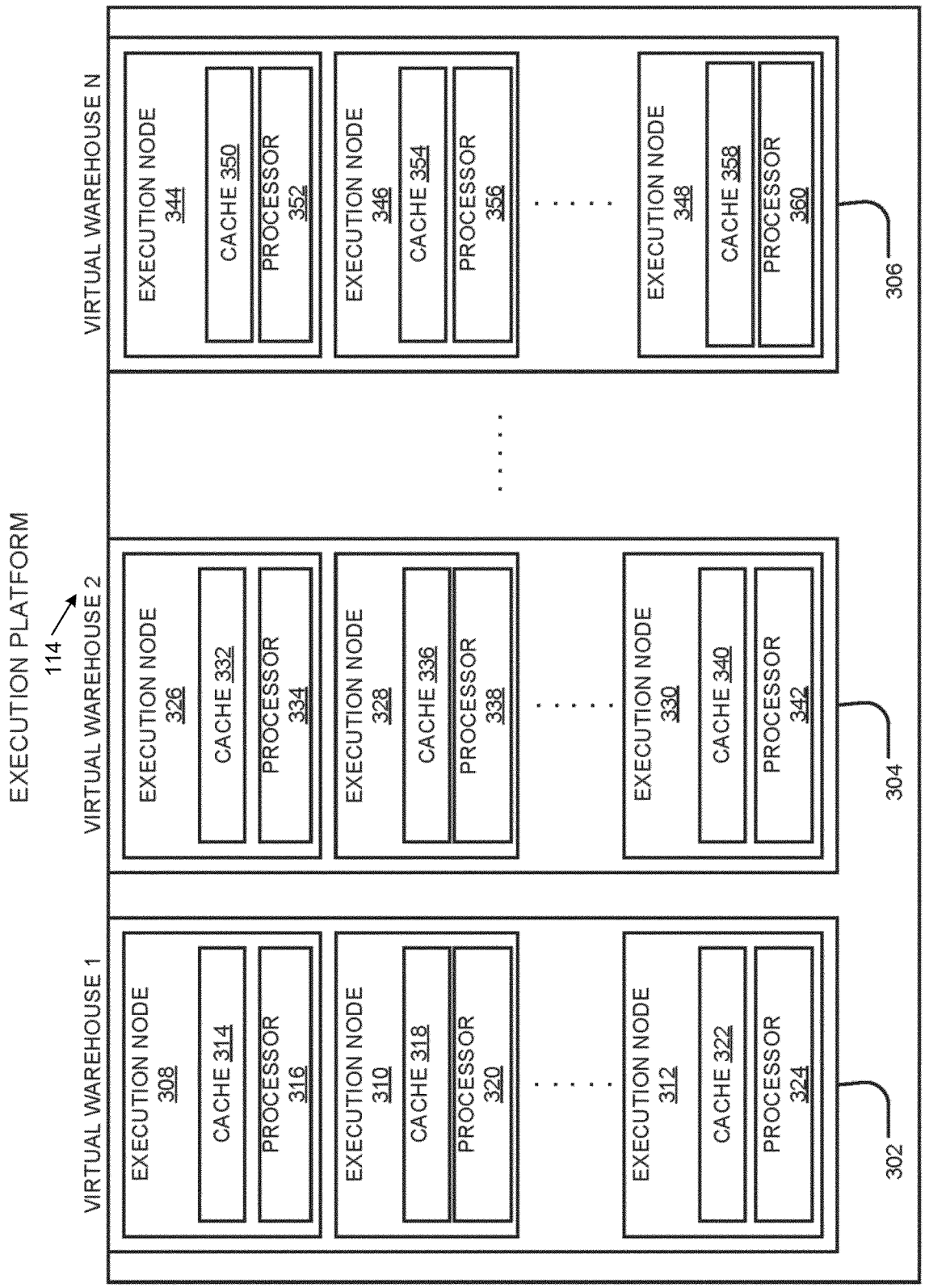
FIG. 3 illustrates a block diagram depicting an embodiment of an execution platform in accordance with the teachings and principles of the disclosure.

FIG. 3 is a block diagram depicting an embodiment of an execution platform 114. As shown in FIG. 3, the execution platform 114 includes multiple virtual warehouses 302, 304, and 306 (e.g., from 1 to N, where N is a natural number). Each virtual warehouse includes multiple execution nodes that each includes a cache and a processor. Although each virtual warehouse 302, 304, 306 shown in FIG. 3 includes three execution nodes, a particular virtual warehouse may include any number of execution nodes without departing from the scope of the disclosure. Further, the number of execution nodes in a virtual warehouse is dynamic, such that new execution nodes are created when additional demand is present, and existing execution nodes are deleted when they are no longer necessary.

Each virtual warehouse 302, 304, 306 is capable of accessing any of the data storage devices 124-1, . . . , 124-N shown in FIG. 1. Thus, virtual warehouses 302, 304, 306 are not necessarily assigned to a specific data storage device 116, 118, 120 and, instead, can access data from any of the data storage devices 124-1, . . . , 124-N. Similarly, each of the execution nodes shown in FIG. 3 can access data from any of the data storage devices 124-1, . . . , 124-N. In some embodiments, a particular virtual warehouse or a particular execution node may be temporarily assigned to a specific data storage device, but the virtual warehouse or execution node may later access data from any other data storage device.

In the example of FIG. 3, the virtual warehouse 302 includes three execution nodes 308, 310, and 312. The execution node 308 includes a cache 314 and a processor 316. Execution node 310 includes a cache 318 and a processor 320. The execution node 312 includes a cache 322 and a processor 324. Each execution node 308, 310, 312 is associated with processing one or more data storage and/or data retrieval tasks. For example, a particular virtual warehouse may handle data storage and data retrieval tasks associated with a particular user or customer. In other implementations, a particular virtual warehouse may handle data storage and data retrieval tasks associated with a particular data storage system or a particular category of data.

Similar to virtual warehouse 302 discussed above, the virtual warehouse 304 includes three execution nodes 326, 328, and 330. Execution node 326 includes a cache 332 and a processor 334. Execution node 328 includes a cache 336 and a processor 338. Execution node 330 includes a cache 340 and a processor 342. Additionally, virtual warehouse 306 includes three execution nodes 344, 346, and 348. Execution node 344 includes a cache 350 and a processor 352. Execution node 346 includes a cache 354 and a processor 356. Execution node 348 includes a cache 358 and a processor 360.

Although the execution nodes shown in FIG. 3 each include one cache and one processor; alternative embodiments may include execution nodes containing any number of processors and any number of caches. Additionally, the caches may vary in size among the different execution nodes. The caches shown in FIG. 3 store, in the local execution node, data that was retrieved from one or more data storage devices in a storage platform 104 (see FIG. 1). Thus, the caches reduce or eliminate potential bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem. In some embodiments, the caches are implemented using high-speed memory devices that provide fast access to the cached data. Each cache can store data from any of the storage devices in storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, a particular execution node may be assigned more processing resources if the tasks performed by the execution node become more processor intensive. Similarly, an execution node may be assigned more cache resources if the tasks performed by the execution node require a larger cache capacity.

Although the virtual warehouses 302, 304, 306 are associated with the same execution platform 114 of FIG. 1, the virtual warehouses 302, 304, 306 of FIG. 3 may be implemented using multiple computing systems at multiple geographic locations. For example, the virtual warehouse 302 can be implemented by a computing system at a first geographic location, while the virtual warehouses 304 and 306 are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, a particular instance of the virtual warehouse 302 implements execution nodes 308 and 310 on one computing platform at a particular geographic location and implements execution node 312 at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse. The execution platform 114 is also fault tolerant. For example, if one virtual warehouse fails, that virtual warehouse is quickly replaced with a different virtual warehouse at a different geographic location.

A particular execution platform 114 may include any number of virtual warehouses (in addition to the illustrated virtual warehouses 302, 304, 306). Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

Figure 4:
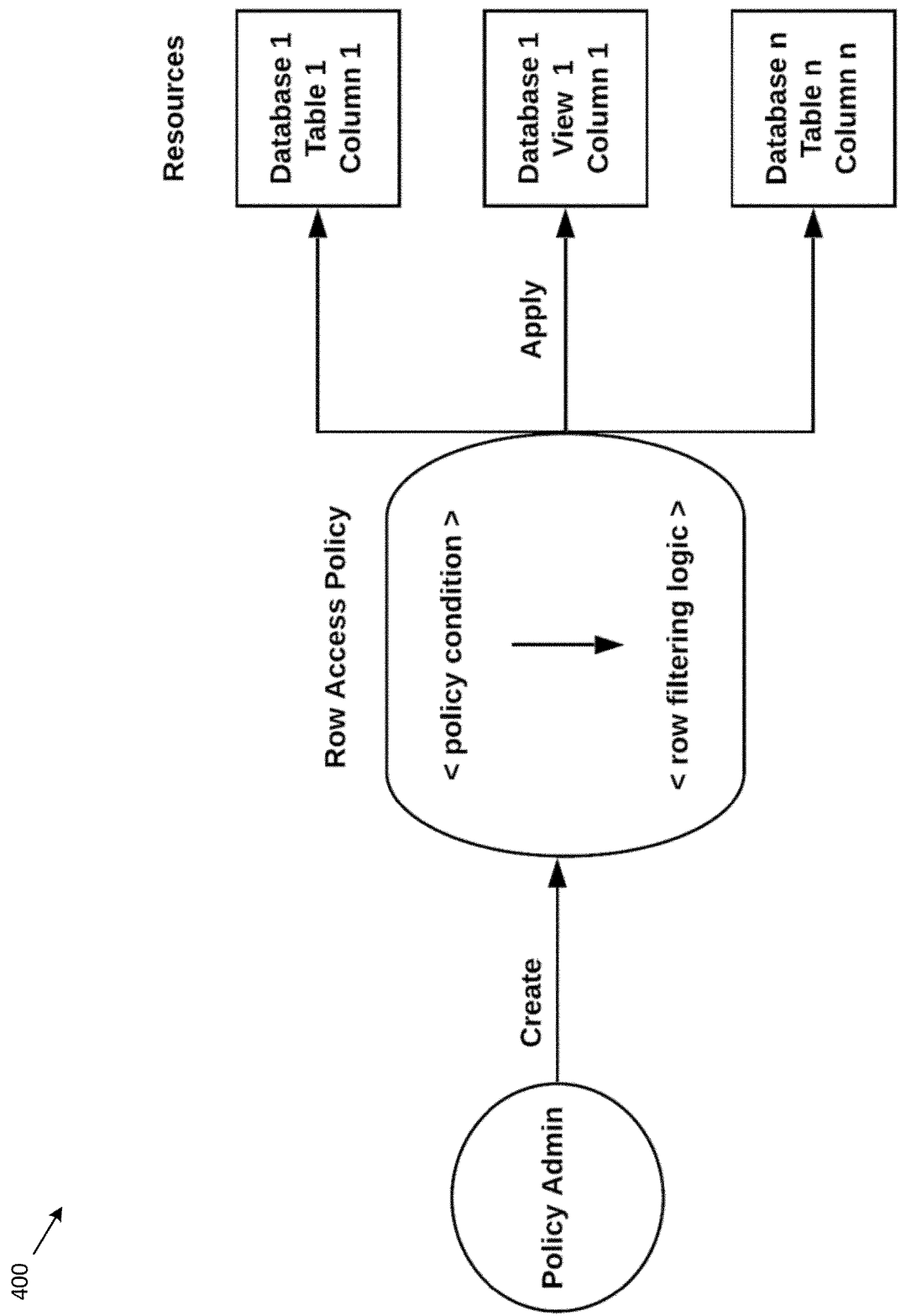
FIG. 4 illustrates a schematic diagram of implementing a row access policy (RAP) in a data warehouse system in accordance with the teachings and principles of the disclosure.

FIG. 4 illustrates a schematic diagram 400 of implementing a row access policy (RAP) in a data warehouse system in accordance with the teachings and principles of the disclosure. As shown, a RAP may be created by a policy administrator. The policy administrator may define various policy conditions to be implemented as row filtering logics in data resources. For example, a RAP includes an expression that specifies database objects (e.g., table or view) and uses conditional expression functions and/or context functions to determine which rows (or columns) may be visible to a specific user or role in certain contexts or conditions. The execution platform 114 or the compute service manager 112 may evaluate the policy expression by using the role of the policy owner (not necessarily the role of the operator who executes the query). As such, the query result is not returned or executed based on the query operator's role (which may not have access to the mapping tables in the RAP).

In some implementations, at a query runtime, the compute service manager 112 determines whether a RAP is set (or attached to) on a database object. If a database object is protected by a RAP, all rows are protected by the RAP. A dynamic secure view (e.g., a secure inline view) of the database object may then be created based on the role of the query and the RAP. The values of the columns may be bound to the corresponding parameters in the RAP. The RAP expression is evaluated. The query output is then generated for the user and the query output may contains only rows based on the RAP definition evaluating to be "True."

Figure 5:
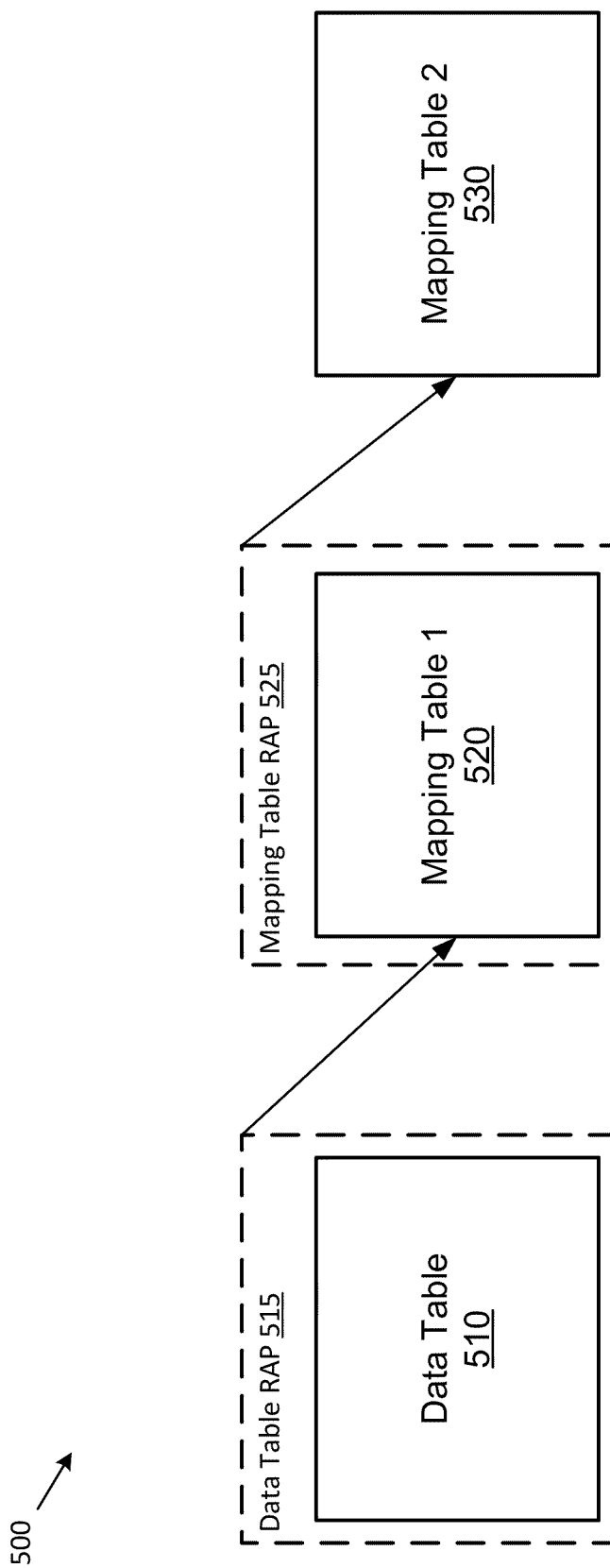
FIG. 5 illustrates an example implementation of a nested RAP in accordance with the teachings and principles of the disclosure.

FIG. 5 illustrates an example implementation 500 of a nested RAP in accordance with the teachings and principles of the disclosure. As shown, a user may create the data table RAP 515 that protects the data table 510 and references the first mapping table 520 protected by the mapping table RAP 525. The mapping table RAP 525 references a second mapping table 530. Conventional practice does not allow creating the data table RAP 515 because of the mapping table RAP 525. The disclosed nested RAP techniques herein overcome such limitations and improves operational efficiency by avoiding duplications required for workarounds in view of the limitations.

A data table stores data entities of a system, such as information of customers, products, orders, etc. A mapping table (or a junction table, cross-reference table, join table) establishes a many-to-many relationship between records in two other tables (as shown in FIG. 5, the first mapping table 520 establishes the relationship between the data table 510 and the second mapping table 530).

For example, a policy administrator may want a user to only view processes owned by the user's role, and process steps corresponding to the processes owned by the user's role. In conventional practice (without the nested RAP mechanism herein), suppose there are three tables, when evaluating the RAP on table 3, the RAP on table 2 would not be executed. According to the nested RAP herein, a user may only access steps that map to processes owned by the user's role. In an example RAP, the PROCESS_STEP table needs only to reference the PROCESS table. Since the SELECT FROM PROCESS statement is executed with the RAP on PROCESS table, the PROCESS_STEP_RAP needs not reference the ROLE_TO_OWNER_MAP table. Therefore, by allowing a user to create a RAP on the data table 510, users or customers may define RAPs that refer to other RAP-protected tables. The disclosed method eliminates the need for duplicating columns or logic from other RAPs and the overhead of keeping the duplicates in synchronization with the original. Users may thus enjoy various benefits of RAP, with multiple levels of filtering, and no additional overhead.

During operation, a data definition language (DDL) or data query language (DQL) query may run or be executed successfully (instead of erroring out in conventional practices). For example, during the name resolution step of structured query language (SQL) compilation, the RAP user defined functions (UDFs) are evaluated and the parse Tree is updated multiple times. The parse tree with the expanded RAP UDF will continuously be updated until either: i) there are no more nodes with RAP UDFs to process; or ii) a pre-determined number of iterations (RAP-chain length) has been reached. In some embodiments, various RAP related functionalities may also benefit the user creating the data table RAP.

Using a toy e-commerce store as an example, two tables are presented: regional_mangers (mapping table) and purchases (data table). One objective of using the nested RAP is that managers may only view: their own region assignments; and purchases from the regions that they manage. According to conventional practice, a user would have to duplicate the manager column into the purchases table. A Boolean operation on the tables with the manager role and the region (according to the RAP) is performed. Since the regions table has a RAP attached to it, the regions table cannot be used as a mapping table by the RAP for the Purchases table. As a result, the manager column, required for evaluating the RAP expression, needs to be present in the Purchases table as well. This means that when a region is assigned to a new manager, the cloud data service would have to update all the corresponding rows of the Purchase table, which introduces the possibility of the Purchases table getting out of sync with the Regions table.

The nested RAP methods disclosed herein solves this issue in the example. The RAP on the Purchases table may use the Regional Managers table as a mapping table (though RAP protected). Thus, the Purchases table does not need the manager column, eliminating the possibility of data going out of sync. The nested RAP also enables users to roll out RAP to the entire account. In particular, as shown in FIG. 5, the data table RAP 515 for the data table 510 may reference the RAP-protected mapping table 520. In some cases, the cross referencing is enabled when the role creating the data table RAP 515 has ownership privileges on the mapping table RAP 525. Therefore, attaching a RAP on the Purchases table to reference the RAP-protected Regions table saves the need for a manager column in the Purchases table.

In some cases, distributed data management (DDM) on data table may reference a RAP-protected mapping table. For example, sales managers may view unmasked names of only the customers who have made a purchase in the regions of the sales managers. A DDM (as the data table 510) on the customer column that uses the regions mapping table (as the mapping table 520) may achieve such query/operations.

In some cases, the nested RAP mechanism herein supports a recursive RAP. For example, some users' use-cases follow a hub & spoke model, with only one RAP-protected mapping table used by multiple data tables.

In some implementations, the SQL expression is validated for the mapping table 520. In conventional practices, the validation check would fail when the mapping table 520 is attached with the mapping table RAP 525. According to aspects of this disclosure, the validation check is improved so that the validation check goes through in view of one or more of the following conditions: the parameter for gating the nested RAP feature is enabled; the mapping table policy is created with the EXEMPT_OTHER_POLICIES flag set; or the role attempting to create or execute the data table policy also has ownership privileges on the mapping table policy.

In some implementations, the Data table RAP 515 may reference the RAP-protected mapping table 520 when the creator of the data table RAP 515 has ownership privileges on the mapping table RAP 525. In some cases, when the current role (of the user or customer) does not have ownership privileges on the mapping table RAP 525, the data table RAP 515 or DDM are not created (or executed in response to operation requests). That is, for security considerations, the current role must have ownership privileges on the mapping table RAP 525 as well (in addition to the parameter and policy exemption requirements) in order to create the RAP 515.

In some cases, the nested RAP mechanism may allow a user to disable invocation of the mapping table RAP 525, and does not result in additional computation, so scalability metrics would be identical to existing RAP/DDM use cases. In some cases, the scalability metrics may include a number and size of tables that will use the nested RAP feature, such as about five tables and/or five thousand (5 k) rows.

FIG. 6 is a schematic flow chart diagram of a method 600 for creating a data table RAP referencing a protected mapping table]. The method 600 may be executed by one or more computing resources such as the compute service manager 112 and/or the execution platform 114 as disclosed herein.

The method 600 begins at 610 by defining, by a processing device (such as the processor 1902 of FIG. 7), a first access policy for the mapping table to control access by specific users or under specific conditions. For example, the first access policy is the mapping table RAP 525 and the mapping table is the first mapping table 520 of FIG. 5.

At 620, the processing device defines a second access policy attached to the data table referencing the mapping table. For example, the second access policy is the data table RAP 515.

At 630, the processing device executes, in response to a query, the second access policy of the data table to provide a response or operation of data associated with the data table and the mapping table. Executing the second access policy invokes executing the first access policy of the mapping table.

In aspects, the response or operation of data includes at least one of: selecting, updating, deleting, merging, viewing, or restricting one or more of the above, the data associated with the data table and the mapping table. In some cases, executing the second access policy includes granting, according to the second access policy, an access to steps that map to processes owned by a role whose authority is defined in the first access policy.

In aspects, the first access policy includes a first row access policy (RAP) protecting access to the mapping table. The second access policy comprises a second RAP created by a user to reference the mapping table at the data table. In some cases, the first RAP and the second RAP respectively defines relationships between roles and operation authorities.

In aspects, the method 600 may further include tracking the response or operation in response to the query and related changes to the data table and the mapping table.

In aspects, the method 600 may further include verifying an active status of a role in the query during executing the first and the second access policies.

In aspects, defining the second access policy is based on a history of operations by a plurality of roles of the data table referencing the mapping table.

Figure 7:
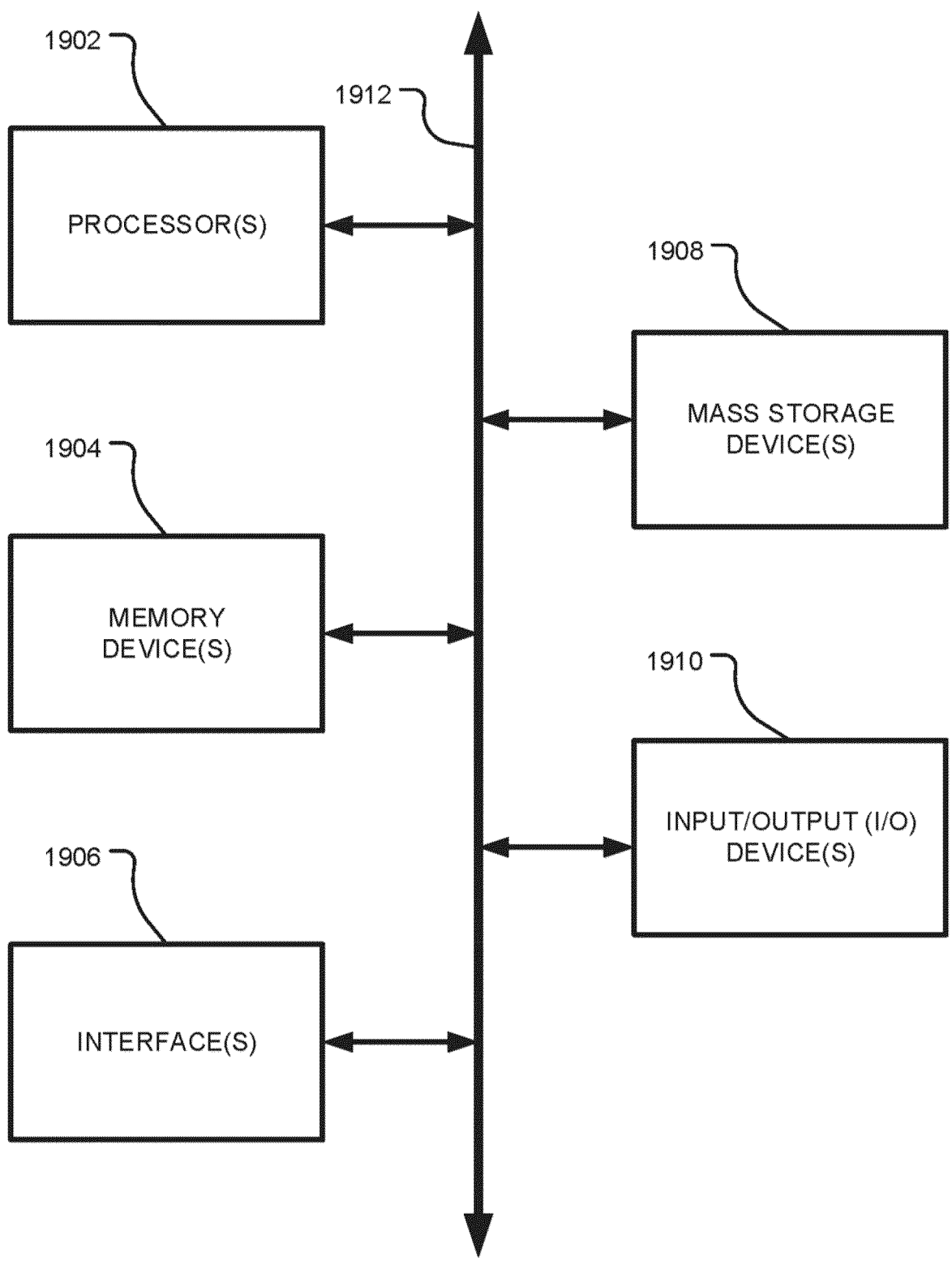
FIG. 7 illustrates an example computing device in accordance with the teachings and principles of the disclosure.

FIG. 7 is a block diagram depicting an example computing device 1900. In some embodiments, computing device 1900 is used to implement one or more of the systems and components discussed herein. For example, computing device 1900 may allow a user or administrator to access the compute service manager 112. Further, computing device 1900 may interact with any of the systems and components described herein. Accordingly, computing device 1900 may be used to perform various procedures and tasks, such as those discussed herein. Computing device 1900 can function as a server, a client or any other computing entity. Computing device 1900 can be any of a wide variety of computing devices, such as a desktop computer, a notebook computer, a server computer, a handheld computer, a tablet, and the like.

Computing device 1900 includes one or more processor(s) 1902, one or more memory device(s) 1904, one or more interface(s) 1906, one or more mass storage device(s) 1908, and one or more Input/Output (I/O) device(s) 1910, all of which are coupled to a bus 1912. Processor(s) 1902 include one or more processors or controllers that execute instructions stored in memory device(s) 1904 and/or mass storage device(s) 1908. Processor(s) 1902 may also include various types of computer-readable media, such as cache memory.

Memory device(s) 1904 include various computer-readable media or non-transitory memories, such as volatile memory (e.g., random access memory (RAM)) and/or non-volatile memory (e.g., read-only memory (ROM)). Memory device(s) 1904 may also include rewritable ROM, such as Flash memory.

Mass storage device(s) 1908 include various computer readable media, such as magnetic tapes, magnetic disks, optical disks, solid state memory (e.g., Flash memory), and so forth. Various drives may also be included in mass storage device(s) 1908 to enable reading from and/or writing to the various computer readable media. Mass storage device(s) 1908 include removable media and/or non-removable media.

I/O device(s) 1910 include various devices that allow data and/or other information to be input to or retrieved from computing device 1900. Example I/O device(s) 1910 include cursor control devices, keyboards, keypads, microphones, monitors or other display devices, speakers, printers, network interface cards, modems, lenses, CCDs or other image capture devices, and the like.

Interface(s) 1906 include various interfaces that allow computing device 1900 to interact with other systems, devices, or computing environments. Example interface(s) 1906 include any number of different network interfaces, such as interfaces to local area networks (LANs), wide area networks (WANs), wireless networks, and the Internet.

Bus 1912 allows processor(s) 1902, memory device(s) 1904, interface(s) 1906, mass storage device(s) 1908, and I/O device(s) 1910 to communicate with one another, as well as other devices or components coupled to bus 1912. Bus 1912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1900 and are executed by processor(s) 1902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the term "module" is intended to convey the implementation apparatus for accomplishing a process, such as by hardware, or a combination of hardware, software, and/or firmware, for the purposes of performing all or parts of query operations.

The systems and methods described herein allow data to be stored and accessed as a service that is separate from computing (or processing) resources. Even if no computing resources have been allocated from the execution platform, data is available to a virtual warehouse without requiring reloading of the data from a remote data source. Thus, data is available independently of the allocation of computing resources associated with the data. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method of referencing a mapping table in a data table, the method comprising:
defining, by a processing device, a first access policy for the mapping table to control access by specific users or under specific conditions;
defining, by the processing device, a second access policy attached to the data table referencing the mapping table;
in response to a query, executing, by the processing device, the second access policy of the data table to provide a response or operation of data associated with the data table and the mapping table, wherein executing the second access policy invokes executing the first access policy of the mapping table; and
recording the executing of the second access policy of the data table and the executing of the first access policy of the mapping table for relationship verification.

2. The method of claim 1, wherein the response or operation of data comprises at least one of:
selecting, updating, deleting, merging, viewing, or restricting one or more thereof, the data associated with the data table and the mapping table.

3. The method of claim 2, wherein executing the second access policy comprises:
granting, according to the second access policy, an access to steps that map to processes owned by a role whose authority is defined in the first access policy.

4. The method of claim 1, wherein the first access policy comprises a first row access policy (RAP) protecting access to the mapping table, and wherein the second access policy comprises a second RAP created by a user to reference the mapping table at the data table.

5. The method of claim 4, wherein the first RAP and the second RAP respectively defines relationships between roles and operation authorities.

6. The method of claim 1, further comprising:
tracking the response or operation in response to the query and related changes to the data table and the mapping table.

7. The method of claim 1, further comprising:
verifying an active status of a role in the query during executing the first and the second access policies.

8. The method of claim 1, wherein defining the second access policy is based on a history of operations by a plurality of roles of the data table referencing the mapping table.

9. A machine-storage medium embodying instructions that, when executed by a machine, cause the machine to perform operations of referencing a mapping table in a data table, the operations comprising:
defining, by a processing device, a first access policy for the mapping table to control access by specific users or under specific conditions;
defining, by the processing device, a second access policy attached to the data table referencing the mapping table;
in response to a query, executing, by the processing device, the second access policy of the data table to provide a response or operation of data associated with the data table and the mapping table, wherein executing the second access policy invokes executing the first access policy of the mapping table; and
recording the executing of the second access policy of the data table and the executing of the first access policy of the mapping table for relationship verification.

10. The machine-storage medium of claim 9, wherein the response or operation of data comprises at least one of:
selecting, updating, deleting, merging, viewing, or restricting one or more thereof, the data associated with the data table and the mapping table.

11. The machine-storage medium of claim 9, wherein the operations further comprise:
tracking the response or operation in response to the query and related changes to the data table and the mapping table.

12. The machine-storage medium of claim 9, wherein the operations further comprise:
verifying an active status of a role in the query during executing the first and the second access policies.

13. A system of referencing a mapping table in a data table, the system comprising:
one or more processors of a machine; and
a memory storing instructions that, when executed by the one or more processors, cause the machine to perform operations comprising:
receiving a query;
in response to the query, executing, by a processing device, a second access policy attached to the data table referencing the mapping table to provide a response or operation of data associated with the data table and the mapping table, wherein executing the second access policy invokes executing a first access policy for the mapping table to control access by specific users or under specific conditions; and
recording the executing of the second access policy of the data table and the executing of the first access policy of the mapping table for relationship verification.

14. The system of claim 13, wherein the response or operation of data comprises at least one of:
selecting, updating, deleting, merging, viewing, or restricting one or more thereof, the data associated with the data table and the mapping table.

15. The system of claim 14, wherein executing the second access policy comprises:
granting, according to the second access policy, an access to steps that map to processes owned by a role whose authority is defined in the first access policy.

16. The system of claim 13, wherein the first access policy comprises a first row access policy (RAP) protecting access to the mapping table, and wherein the second access policy comprises a second RAP created by a user to reference the mapping table at the data table.

17. The system of claim 16, wherein the first RAP and the second RAP respectively defines relationships between roles and operation authorities.

18. The system of claim 13, wherein the operations further comprise:
tracking the response or operation in response to the query and related changes to the data table and the mapping table.

19. The system of claim 13, wherein the operations further comprise:
verifying an active status of a role in the query during executing the first and the second access policies.

20. The system of claim 13, wherein defining the second access policy is based on a history of operations by a plurality of roles of the data table referencing the mapping table.

* * * * *